Nov. 28, 1950           H. R. MOULTON           2,531,945
REFLECTION REDUCING COATINGS HAVING UNIFORM REFLECTION
FOR ALL WAVE LENGTHS OF LIGHT AND
METHOD OF FORMING SUCH COATINGS

Filed April 5, 1947           3 Sheets-Sheet 1

PER CENT OF #155 SOLUTION

INVENTOR.
HAROLD R. MOULTON
BY
*Louis L. Gagnon*
ATTORNEY

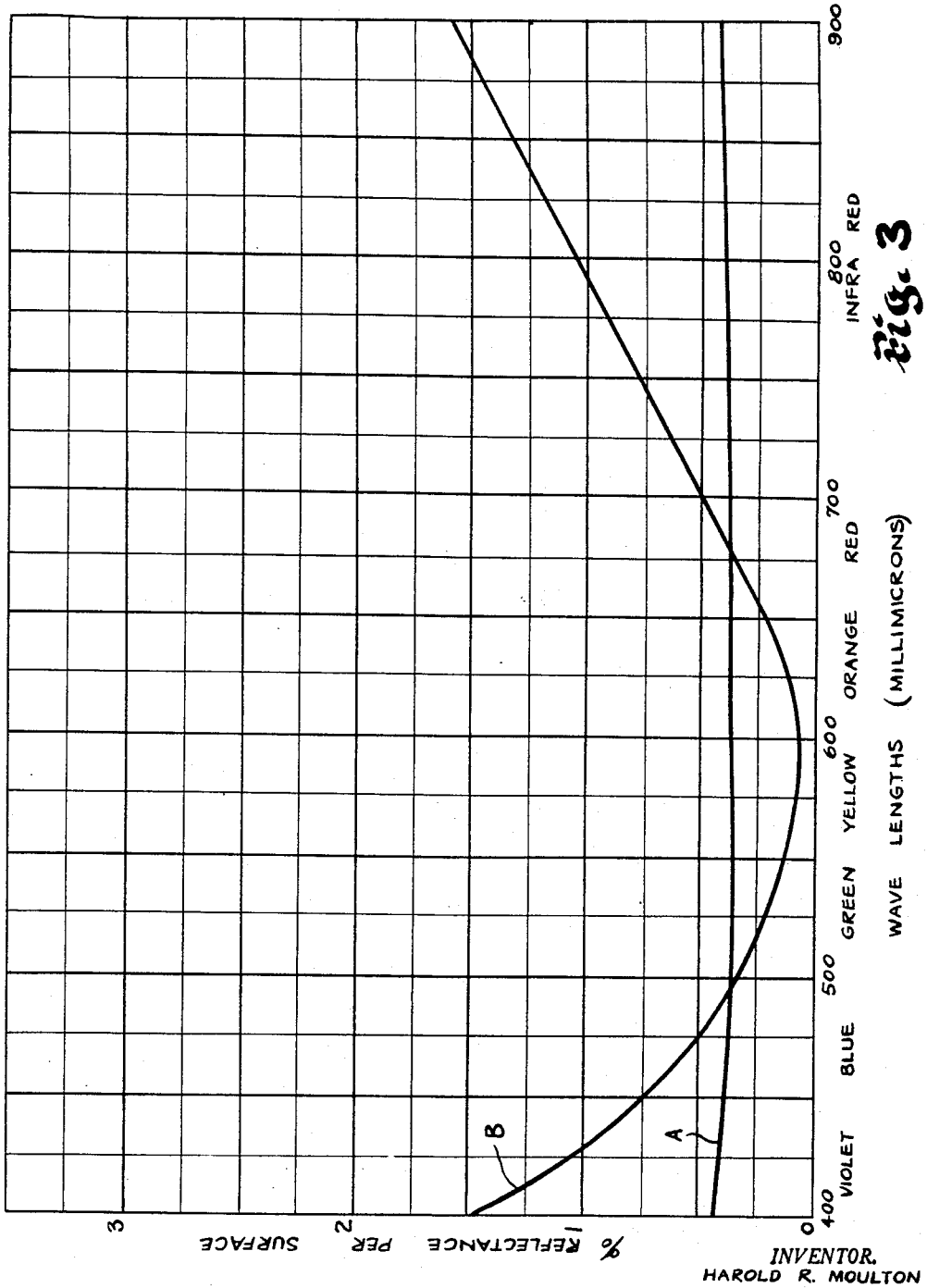

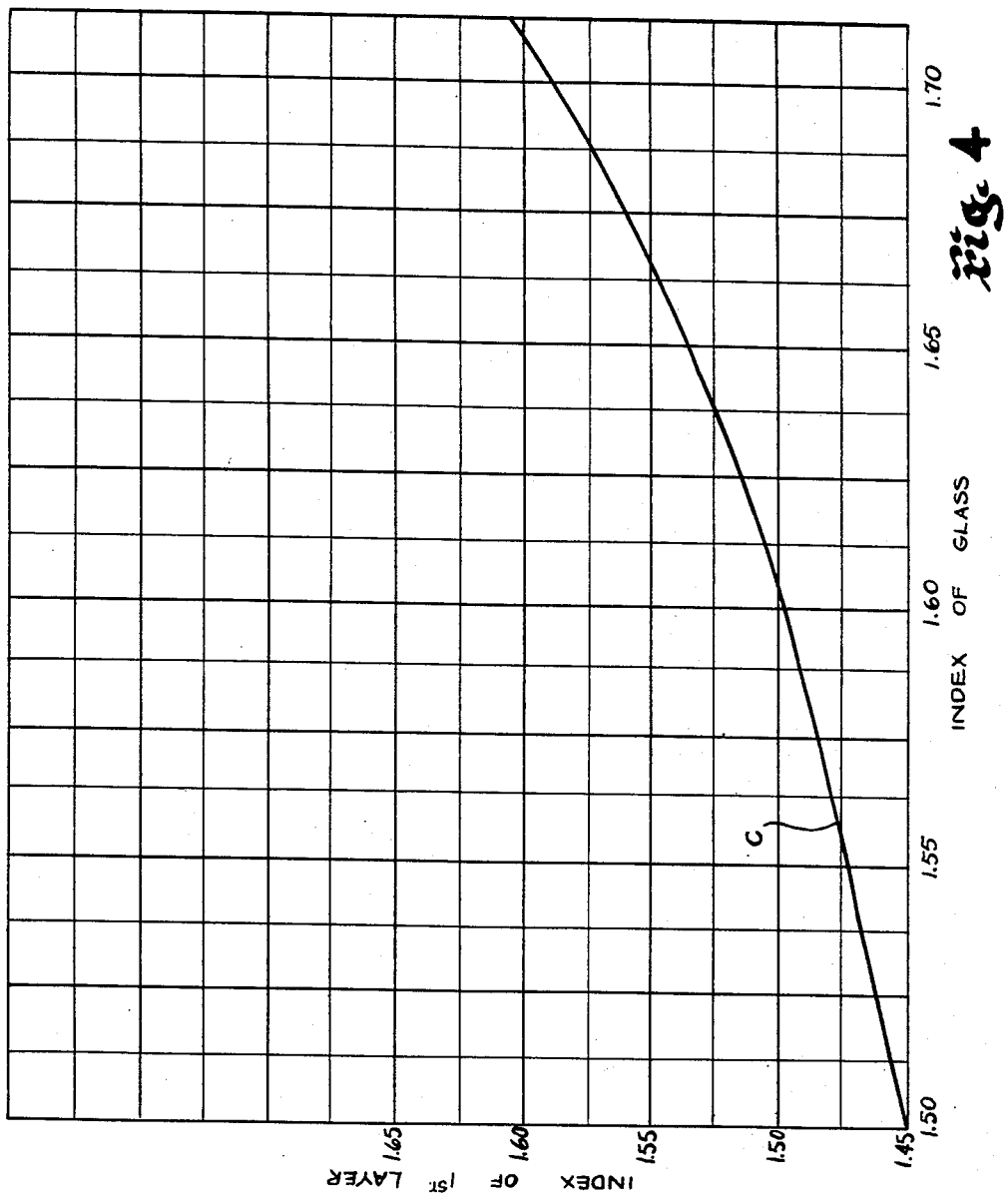

Patented Nov. 28, 1950

2,531,945

UNITED STATES PATENT OFFICE 2,531,945

REFLECTION REDUCING COATINGS HAVING UNIFORM REFLECTION FOR ALL WAVE LENGTHS OF LIGHT AND METHOD OF FORMING SUCH COATINGS

Harold R. Moulton, Southbridge, Mass., assignor to American Optical Company, Southbridge, Mass., a voluntary association of Massachusetts Application April 5, 1947, Serial No. 739,546

10 Claims. (Cl. 88—1)

This invention relates to novel means and methods of reducing reflections from the surfaces of a given article.

The present application is a continuation in part of my co-pending application, Serial No. 478,980, filed March 12, 1943 (now Patent No. 2,432,484 issued December 9, 1947).

A principal object of the invention is to provide a surface reflection reducing coating which will be substantially free from selective spectral transmission.

Another object is to provide a surface reflection reducing coating for an article that will be substantially neutral in reflected light.

Another object is to provide means and methods of producing low surface reflection coatings of high light transmitting power, substantially non-selective as to the color of the reflected or transmitted light.

Another object is to provide coatings of the above nature which will be relatively durable and permanent.

Another object is to provide simple, efficient and economical methods for providing articles with coatings of the above character.

Another object is to provide a transparent article such as a lens with a reflection-reducing coating that will reflect a neutral or dark gray color.

Another object of the invention is to provide a method for reducing surface reflections of a transparent article without substantially altering the spectral transmission of said article.

Another object of the invention is to provide a coating for an article of a given index of refraction comprising a plurality of layers wherein the composition of the first or under-layer is controlled according to the index of refraction of the article and which layers cooperate to reduce the surface reflections of the article without introducing color to the transmitted light.

Other objects and advantages of the invention will become apparent from the following description and drawings and it will be apparent that many changes may be made in the details of compositions, construction, arrangement of parts and steps of the methods shown and described without departing from the spirit of my invention as expressed in the accompanying claims.

Figure 5:
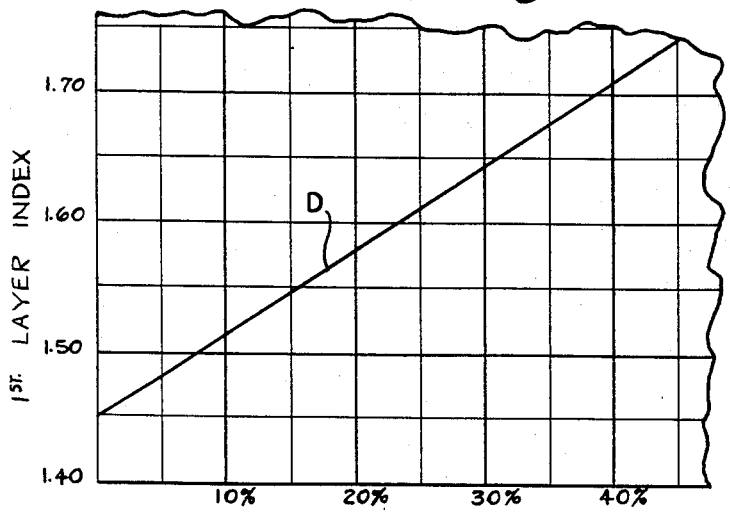

Fig. 3 graphically illustrates the reflection of light waves throughout the visible spectrum as had by an article coated according to the invention and as compared to the same article coated without the under-layer of this coating;

Fig. 4 graphically denotes the amount of #155 solution to be mixed with the #50 solution to produce an under-layer of the desired index of refraction; and Fig. 5 graphically denotes the index of refraction that the under-layer should possess for articles of different indices of refraction.

Previous to applicant's invention, coatings applied to articles so as to reduce surface reflections therefrom and to increase the transmission of light would invariably reflect substantial color. Applicant's coatings differ from such prior art coatings in that the extremely small amount of light reflected from them is not colored, that is, the glass, or other substrate upon which the coating is produced appears to have a dark gray reflection. This is completely new as far as is known. All other known low reflection coatings have increased reflection at some portion of the spectrum whereby a blue, purple or brown appearance is imparted to the reflected light, the transmitted light being deficient in the colors which were selectively reflected by the coating.

In the case of the substantially neutral coating which applicant teaches, the light transmitted by the coated article (which may be a lens element, prism or the like) does not have its true spectral properties distorted or changed. This freedom from distortion of color values is particularly desirable in multi-component optical systems in which the number of surfaces is considerable. This is especially true in the case of camera or projection optics which are to be used in combination with color photography inasmuch as the colors will not be degraded.

Figure 1:
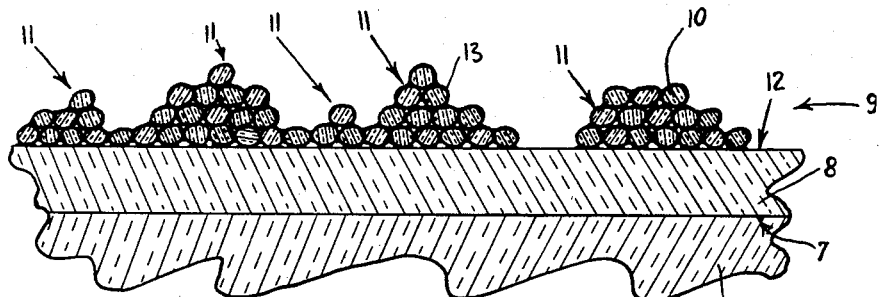
Fig. 1 illustrates in diagrammatic form a highly magnified fragmentary sectional view of an article having a surface reflection reducing coating according to the invention.
Figure 2:
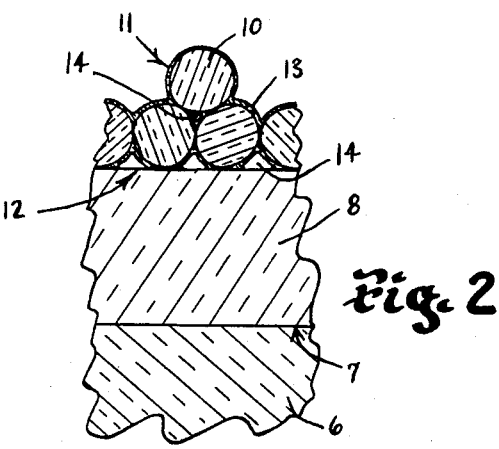
Fig. 2 illustrates a more highly magnified cross sectional view thereof.

As shown in Fig. 1, the article to be coated comprises a substrate 6 of light transmitting material such as glass or plastic and has a known index of refraction. In this particular instance, the substrate 6 is of ordinary crown glass which has an index of refraction between 1.50 and 1.52. The surface 7 of the substrate 6 is initially coated with a layer 8 of low index material to a thickness approximately one-fifth of a wave length of the transmitted light. The material applied is preferably silica which has an index of refraction of approximately 1.45. A layer of the proper thickness when applied to both surfaces of the subtrate will cause the article to have a pinkish brown appearance by reflected light.

Although any convenient method for applying said first layer 8 of silica, may be used, it is proposed to produce such a layer by applying a coating of a solution, which upon evaporation will deposit such a layer of silica on the glass or substrate. The material which forms this layer need not be present in the solution in the actual form in which it finally exists on the surface of the article but may be a decomposable compound which upon the removal of the solvent leaves a surface layer on the substrate in the desired state. For example, a solution of from 1 to 10 per cent by volume of tetraethylorthosilicate, 0 to 60 per cent by volume ethyl acetate, 1 to 10 per cent by volume of concentrated hydrochloric acid and the balance ethyl alcohol may be used. Denatured alcohol may be substituted for the ethyl alcohol. A preferred solution is 45 parts ethyl acetate, 45 parts denatured alcohol, 4 parts of concentrated hydrochloric acid, and 6 parts tetraethylorthosilicate, mixed in the order given. This gives a clear colorless, stable solution. An essential feature of this solution is aging for several days before use. With the composition set forth above, from two to six days is desirable.

The solution having been prepared and aged, the lens or article 6 being coated is immersed in the solution and immediately spun to remove excess liquid. The spinning of the article is continued until the coating of solution thereon has evaporated sufficiently so that no drips or runs will occur when the article is removed from the holder. Prolonged aging to two or three months produces no further change. This aging normally takes place at room temperature but it can be accelerated slightly by working at more elevated temperatures up to 100° C. The solution also may be poured onto the article as it is spun. Although a temperature of 100° C. has been referred to, it is to be understood that any suitable heating temperature may be used and it has been found that a wider range of temperatures may be used, the top limit being set by the softening or distortion point of the material being treated. Where the article is merely allowed to stand at room temperature after the excess material has been drained or removed by spinning, the article should not be handled for about an hour.

To obtain a uniform coating of the desired thickness, one-fifth of the wave length of light transmitted, preferably a solution containing approximately 6% tetraethylorthosilicate would be used and the article spun at about 1800 revolutions per minute. If a more concentrated solution were prepared, then the article correspondingly would have to be spun at a much faster rate and conversely, if a lower concentration is used, the article would be spun at a lower rate. For example, a solution containing about 7.5% tetraethylorthosilicate would be spun at approximately 2200 R. P. M. A layer of the proper thickness, as set forth above, will appear pinkish brown in reflected light.

It is, of course, to be understood that other alkyl silicates such as tetramethylorthosilicate, or other silicic acid ester may be used instead of the tetraethylorthosilicate and it is also to be understood that nitric acid, sulphuric acid, hydrobromic acid and other acids will be equally as effective as the hydrochloric acid used in the example above. Likewise, other solvents may be used. In fact, almost any organic solvent in which the acid and silicon ester are mutually miscible may be used. Such include methyl acetate, methyl alcohol, isopropyl alcohol, ethylene glycol monoethyl ether, ethylene glycol monobutyl ether, butyl alcohol, and others.

While these layers in their finished form are of great stability, before the heating operation or before the coatings have stood too long it is possible to remove a coating which has been damaged or made too thick, by treatment with dilute alkali in which instance a new layer can be applied.

Said solutions contain a compound which is capable of being decomposed and depositing a continuous layer of silica, such a compound being the silicon ester. They also contain acid as a decomposing agent for the silicon ester. In the dilute solution, as applied, the two reacting materials do not interact rapidly or completely, but as the solvent is removed, the concentrations of the decomposable material and decomposing agent build up until concentrations are reached at which the interaction takes place rapidly. At this time, and not before, the layer of silica is deposited on the surface of the article.

The layer of silica produced is relatively hard, stable, solid, dense and non-porous in nature as opposed to the second layer.

A second layer 9 is then formed on said first layer 8 consisting of a plurality of discrete, micro-granular, sub-microscopic nearly spherical or equi-dimensional transparent solid anhydrous particles 10. Preferably, said particles 10 consist of silica. The layer 9 is produced by applying to the surface of said first layer 8 a suspension having said particles colloidally dispersed therein, and evaporating the liquid so as to produce the layer 9.

Said layer 9 will then comprise a plurality of said particles 10 piled in the form of minute projecting porous mounds 11 or irregularities with the concentration of the particles 10 increasing as the surface 12 of the first layer 8 is reached and the effective index of refraction of said layer varying from substantially unity at the outer face and to a value which progressively increases and approaches that of silica at its inner face. The particles should be less than a wave length of light in size. Preferably, they should have a diameter in the neighborhood of 600 Å. The particles are substantially anhydrous, solid and isometric or nearly spherical and equi-dimensional in shape to permit a piling up of the particles into porous moundlike structures. For this reason, particles of a gel-like, hydrated, fibrous nature are not desirable inasmuch as said particles would tend to mat into a non-porous mass. The clumps of particles likewise are spaced apart less than a wave length of light and the thickness of the layer is approximately a quarter wave length of the light transmitted.

Such suspensions may comprise either aquasols or organo-sols. The particles are preferably silicon dioxide. They may be prepared by chemically reacting in a water solution, a soluble silicate, such as sodium silicate, with an acid such as hydrochloric acid and dializing the resulting gel until substantially free from electrolyte. The water then can be replaced in whole or in part by an organic solvent such as ethylene glycol monoethyl ether, ethyl alcohol, ethylene glycol monomethyl ether, etc. and the concentration of the silica particles adjusted to the desired concentration. They also may be prepared by prolonged ball milling in a suitable organic solvent until the desired fineness has been achieved. The solvent should be a vehicle in which the material is not soluble. Although silica is not especially soluble in water, other vehicles in which they are less soluble are available and it is preferred to use these to water. One such is ethylene glycol monoethyl ether. Others include methyl alcohol, ethyl alcohol etc. A commercially and readily available silica aquasol is preferably used as the source of said particles. Said material has a chemical composition which comes within the following formula:

Silica particles _____ 10 to 12%
Sodium oxide _____ less than 0.05%
$Fe_2O_3 + Al_2O_3$ _____ about 0.1%
 and the balance water
pH _____ about 9.5

The silica particles contained in said material are discrete, micro-granular, transparent, isometric or nearly spherical and equi-dimensional in shape, solid and anhydrous in nature and from 600 to 625 Å. in diameter.

A suspension containing 3% by weight of said silica particles in water or an organic liquid as ethylene glycol monoethyl ether when poured onto the article 6 having the initial coating 8 thereon and the article spun at 1800 R. P. M. (revolutions per minute) will cause to be produced upon evaporation of the liquid a layer of particles of the desired thickness and having the desired characteristics. Said spinning is continued until the coating is dry. The article likewise may be dipped into said suspension and then spun at 1800 R. P. M. If the rate of spinning were increased to 2200 R. P. M. a 3.1% suspension would be used. If the velocity were increased to 4000 R. P. M. an approximately 5% suspension would be used. If the velocity were decreased to 1000 R. P. M. an approximate 1½% suspension would be preferred. The higher the speed of rotation, the higher the concentration of the suspension should be and conversely, the lower the speed of spinning, the lower the concentration of silica particles. Preferably, the 3% concentrated suspension is used and the article spun at 1800 R. P. M. Said second layer may be produced by dipping into such a suspension and withdrawing continuously. Where the rate of withdrawal is approximately four inches per minute, a 4% suspension should be used. If the rate of withdrawal is increased to 12 inches per minute, the concentration of suspension should be correspondingly decreased to about 2%. Said coating may also be applied by painting, spraying, etc. but said methods are not as desirable in that it is more difficult to avoid drips or streaking. In all instances, the volatility of the solvent used as the suspending medium, the viscosity of the suspension and temperature are additional factors to be considered so as to apply a substantially uniform coating of the suspension so as to avoid dripping and streaking. The spinning and dipping methds in general have been found most satisfactory.

Where water is used as the suspending medium for the particles forming the second layer 9, it may be desirable to incorporate in the suspension a small quantity of a suitable surface-tension-reducing ingredient such as a compound similar to the sulphonated higher alcohols.

The production of the ethylene glycol monoethyl ether suspension of silica particles is accomplished by incorporating the desired quantity of the ethylene glycol monoethyl ether with the calculated quantity of aqueous suspension of silica particles such as the silica aquasol referred to above. It is desirable that most of the water be removed. The mixture of ethylene glycol monoethyl ether and silica aquasol at a pH of less than 5.0 is accordingly heated to a temperature sufficient to evaporate the water which volatilizes more rapidly than the ethylene glycol. If a sufficient reduction has taken place (about 10%) and it has been found that sufficient water has been removed the suspension is then made up to the original volume by the addition of the ethylene glycol and is then ready for use.

After the application of said second layer, it may readily be removed by wiping, if for some reason, it is not satisfactory. The coating is very resistant to the attack of many solvents as silica itself is quite insoluble and inert chemically. The coating as produced, however, is not firmly adherent in all instances to said first layer.

To render it more resistant to handling and wiping, a binder layer 13 may be applied to said particles which serves to anchor them in position without completely filling in the pores 14 or spaces between the particles 10. Such a binder coating may comprise a very thin layer of silica deposited on said particles from a solution such as used to produce said first layer 8. The dilution used depends upon the method of application. Such solvents as ethyl acetate, ethyl alcohol, isopropyl alcohol and mixtures thereof may be used for diluting purposes.

Other binders in suitable dilution and solvents may be used, such as gelatin in water, polyvinyl alcohol in water, resins, etc. Likewise, a dilute solution in water of sodium silicate could be used. The dilution, however, should be carefully controlled so that the reflection reduction previously produced will not be destroyed. A suitable composition consists of 200 parts of water to 1 part of sodium silicate.

It has also been found that the fortifying layer can be formed simultaneously with the second layer by the addition of a small proportion of the solution used to produce the first layer to the ethylene glycol sol containing the silica particles. For example, such solution might have the following approximate analysis:

| | Parts by volume |
|---|---|
| Ethylene glycol monoethyl ether | 97 to 133 |
| Ethyl alcohol | 0 to 18 |
| Ethyl acetate | 0 to 18 |
| Tetraethylorthosilicate | 2 |
| Concentrated hydrochloric acid | 2 | and containing 3% by weight of said microgranular silica particles.

It is to be understood that this outer layer 9 may comprise particles having any of the compositions referred to in my co-pending application referred to above and may be formed by the methods therein described.

Thus, by forming a dense, non-porous layer of silica of a thickness approximating a one-fifth of a wave length of the transmitted light upon the surface of an article and on said layer forming a second layer consisting of discrete, micro-granular, sub-microscopic, solid, transparent silica particles in the form of minute projecting porous irregularities which are spaced apart less than a wave length of the light, and with the concentration of the particles increasing as the surface of the first layer is reached so that said layer has an effective index that varies from approximately unity at its air surface to a value approximately that of silica at its inner surface, and being of a thickness approximately a quarter wave length of the light transmitted, a transparent surface reflection coating is provided for the article which will substantially uniformly cut down the reflections for all wave lengths of light, at least through the visible spectrum and so that the small amount of reflected light remaining appears a neutral or dark gray color. This is graphically illustrated by curve A in Fig. 3. Curve B graphically illustrates the reduction of reflection for an article coated only with a quarter wave length thickness of the microgranular particles. Said coated article reflects relatively more in the violet-blue regions and the red regions, than in the green, yellow regions and accordingly said coated articles will have a definite color in reflected light. In curve A, however, the curve is nearly horizontal or straight across the chart. Thus, such a coating does not reflect any one color substantially more than another and if appearing at all colored would appear as a dark gray or neutral shade.

Where the article to be coated has an index of refraction greater than the 1.50 to 1.52 referred to, it has been found that the index of refraction of the under layer 8 must accordingly be increased. Preferably, this is accomplished by uniformly incorporating in the non-porous silica layer a small amount of higher index material. Such may include titanium dioxide which is considered as having an index of refraction of about 2.5, tin oxide having an approximate index of refraction of 2 and tungstic oxide.

Preferably, titanium dioxide is used. By combining a controlled amount of a titanium compound containing solution with the tetraethylorthosilicate containing solution referred to and thoroughly mixing said solutions and applying said mixture to the surface of the article, upon evaporation of the solvents therefrom a silica-titanium dioxide containing layer of the desired index of refraction will be formed. For convenience, the tetraethylorthosilicate solution has been designated as #50 solution and the titanium compound containing solution designated as #155 solution.

The #155 solution is formed by slowly adding to 100 parts of 190 proof ethyl alcohol, and with constant stirring, 10 parts of titanium tetrachloride. The reaction is rather violent and copious white fumes are evolved. Consequently, the addition should be made in a well ventilated place or preferably in a chemical hood. There results a pale yellowish colored liquid which no longer fumes but which is rather acid and should be stored in glass. This is subsequently diluted with more alcohol to provide a solution of the desired concentration. Where the #50 solution used contains 6% of the decomposable silicon compound and is to be poured onto the article as it is being spun at 1800 R. P. M. a #155 solution containing 5% titanium compound is preferred.

Where the substrate to be coated has an index of refraction of 1.616, such as a flint glass, it will be seen by referring to curve C of the chart shown in Fig. 4 that the under layer 8 should have an approximate index of refraction near 1.51. By referring to curve D on the chart shown in Fig. 5 it will be seen that to produce an under layer 8 having such an index of refraction the coating solution should contain about 10% of #155 solution and about 90% of #50 solution.

Where the substrate has an index of refraction of about 1.66, the coating solution should contain about 15% of #155 solution. Where the substrate has an index of refraction of about 1.70, the coating solution should contain about 20% of #155 solution.

In each instance, the combined coating solution of #155 and #50 solutions is applied to the surface of the article, with the concentration of said solution and the rate of spinning or withdrawal related so as to produce a layer 8 consisting of a mixture of silica and titanium dioxide and approximately a 1/5 wave length in thickness and which will have an index of refraction intermediate that of layer 9 and that of the article. The amount of higher index material to be incorporated into said layer being controlled by the index of refraction desired for said under layer 8 and with the index of refraction of said under layer 8 being varied according to the index of the substrate. To said layer 8 is applied the second layer 9 consisting of the discrete, sub-microscopic, micro-granular, solid, transparent particles piled in porous mounds or irregularities as described above and to a thickness approximately 1/4 wave length of the light transmitted. Such coatings will substantially cut down reflections from the surface of the article coated and with substantially no change in the color of the reflected light.

From the foregoing description, it will be apparent that simple, efficient and economical means and methods have been provided for accomplishing all of the objects and advantages of the invention.

Having described my invention, I claim:

1. A coated article comprising a substrate formed of light transmitting material and having a given index of refraction greater than unity, said article having a substantially archromatic surface reflection reducing coating on a surface thereof, said coating consisting of a transparent dense layer of silica on the surface of said substrate having an index of refraction less that of the substrate and of a thickness of approximately a one-fifth wave length of the incident light and a second layer of discrete microgranular, submicroscopic transparent solid particles of silica on the surface of said first layer of a thickness of approximately 1/4 wave length of the incident light, said particles being piled in irregularities that are spaced less than a wave length of light apart and with the concentration of said particles increasing as the surface of said first layer is reached whereby the effective index of said second layer varies from approximately unity to a value approaching that of the first layer, said layers substantially uniformly reducing the reflection of all wave lengths of light from the surface of the coated article.

2. A coated article comprising a substrate formed of light transmitting material and having an index of refraction of from 1.50 to 1.52, said article having a substantially achromatic surface reflection reducing coating on a surface thereof, said coating consists of a transparent dense layer of silica on the surface of said substrate of a thickness of approximately a 1/5 wave length of the incident light and a second layer of discrete, micro-granular, sub-microscopic transparent solid particles on the surface of said first layer, said particles forming minute projecting irregularities that are spaced apart less than a wave length of light, and with the concentration of said particles increasing as the surface of said first layer is reached whereby the effective index of said second layer varies from approximately unity at its air surface to a value approaching that of the index of refraction of said first layer adjacent the surface of said first layer, said layers functioning cooperatively to substantially uniformly reduce the surface reflection from said surface of all wave lengths of light.

3. A coated article comprising a substrate formed of light transmitting material having an index of refraction greater than 1.52, said article having a substantially achromatic surface reflection reducing coating on a surface thereof, said coating consisting of a transparent dense layer of a mixture of silica and titanium dioxide on the surface of said substrate of a thickness of approximately a one-fifth wave length of the incident light and a second layer of discrete, micro-granular, sub-microscopic transparent solid particles on the surface of said first layer, said particles forming minute projecting irregularities that are spaced apart less than a wave length of light, and with the concentration of said particles increasing as the surface of said first layer is reached whereby the effective index of said second layer varies from approximately unity at its air surface to a value approaching that of the index of refraction of said first layer adjacent said surface of the first layer, said layers functioning cooperatively to substantially uniformly reduce the surface reflection from said surface of all wave lengths of light.

4. Coated articles comprising a substrate of a given index of refraction greater than unity, said substrate having a surface reflection reducing coating on a surface thereof characterized by substantially uniform low reflectivity throughout the visible region and adjacent regions of the spectrum, said coating consisting of an outer layer of sub-microscopic discrete microgranular solid transparent particles of silica forming minute projecting irregularities on said surface which are sensibly smaller than a wave length of the incident light, with the concentration of the particles in the irregularities increasing from the air interface of the layer inwardly toward the surface of the substrate and the effective index of refraction of said layer varying from substantially unity at the layer-air interface to an index value which progressively increases in a direction inwardly of the layer and approaches the index of refraction of the material of the substrate, said coating being of the order of a ¼ wave length of the incident light in optical thickness, and normally varying in reflectivity for different wave lengths of light, and a layer intermediate said outer layer and the surface of the substrate, substantially ⅕ wave length of the incident light in optical thickness, and consisting of a solid, uniform smooth transparent homogeneous mixture of titanium oxide and silica, said layer having a controlled index of refraction between that of the substrate and the greatest index value of the outer layer, with said optical thickness, and index of refraction of the inner layer functioning cooperatively with the index of refraction, optical thickness and structure of the outer layer so as to substantially eliminate said variations in reflectivity with wavelengths of the outer layer.

5. A coated article having substantially achromatic low reflecting characteristics comprising a substrate having a first layer of transparent dense material thereon of an optical thickness of approximately a one-fifth wave length of incident light, and a second outer layer of discrete, micro-granular, sub-microscopic, transparent solid particles on the surface of said first layer, said particles forming minute irregularities that are spaced less than a wave length of light apart with the concentration of said particles in the irregularities increasing as the surface of the first layer is reached, the effective index of refraction of said layer varying from substantially unity at the layer-air interface to a given maximum value adjacent the surface of said first layer, said second outer layer having a total optical thickness of substantially one-fourth wave length of the incident light, and the index of refraction of said first layer being greater than the maximum value of the index of refraction of the second layer and being less than that of the substrate by an amount such as to produce a resultant coated article having substantially achromatic low reflection characteristics.

6. A coated article having substantially achromatic low reflecting characteristics comprising a substrate having an index of refraction lying within the range of from about 1.50 to 1.70, said substrate having a first layer of transparent dense material on a surface thereof to an optical thickness of approximately a one-fifth wave length of incident light, and a second outer layer of discrete, micro-granular, sub-microscopic, transparent solid particles on the surface of said first layer, said particles forming minute irregularities that are spaced less than a wave length of light apart with the concentration of said particles increasing as the surface of the first layer is reached, the effective index of refraction of said layer varying from substantially unity at the layer-air interface to a given maximum value adjacent said surface of the first layer, said second layer having a total optical thickness of substantially a one-fourth wave length of said incident light, with the index of refraction of said first layer being greater than the maximum value of the index of refraction of the second layer and less than that of the substrate, the difference in value between the indices of refraction of the first layer and the substrate being greater than .05 accordingly as the index value of the substrate exceeds 1.50, so as to produce a resultant coated article having substantially achromatic low reflection characteristics, and with said difference in value not substantially exceeding .12.

7. A coated article having substantially achromatic low reflecting characteristics comprising a substrate having a first layer of transparent dense material thereon of an optical thickness of approximately a one-fifth wave length of incident light and a second layer of discrete, microgranular, sub-microscopic, transparent solid particles on the outer surface of said first layer, said particles forming minute irregularities that are spaced less than a wave length of light apart, with the concentration of said particles increasing as the outer surface of said first layer is reached, the effective index of refraction of said layer varying from substantially unity at the layer-air interface to a given maximum index of refraction adjacent the outer surface of said first layer, said second layer having a total optical thickness of substantially one-fourth wave length of incident light, and normally varying in reflectivity for different wave lengths of light, the index of refraction of said first layer being greater than the maximum value of the index of refraction of said second layer and less than that of the substrate by an amount such as to substantially eliminate the variation in reflectivity for different wave lengths of light normally possessed by said second layer, said substrate having an index of refraction lying within the range of from approximately 1.50 to approximately 1.70 and the index of refraction of said first layer lying within the range of from approximately .05 to .12 less than that of the index of refraction of said substrate, and with the index values of said first layer being of an amount which is increased with the increase in the index of refraction of the substrate.

8. The method of forming a substantially achromatic surface reflection reducing coating on the normally light reflecting surface of a transparent article having an index of refraction between approximately 1.50 and approximately 1.70, said method comprising the steps of depositing a substantially smooth layer of transparent material having a controlled composition on said surface of the article to a uniform optical thickness of substantially one-fifth wave length of the incident light, applying onto the exposed surface of said first layer a substantially uniform thin layer of a volatile liquid containing, substantially uniformly dispersed therein, a plurality of discrete, sub-microscopic, microgranular approximately isometric transparent particles of solid substantially anhydrous inorganic material having an index of refraction greater than unity, said particles being of a diameter less than 625 angstroms and substantially insoluble in the liquid, and the liquid being substantially inert in its effect on the particles and on said first layer, and allowing said liquid to evaporate to deposit the particles on the surface of said first layer, while retaining the particles substantially unchanged in their physical character throughout the process, the thickness of the liquid layer applied being controlled according to the concentration of the particles in said layer to produce a resultant dry layer of said particles piled in a plurality of mound-like projections to approximately a quarter wave-length in thickness, the composition of said first layer being so controlled that the material of said first layer will have an index of refraction less than that of the article by a value greater than .05 and increasing up to .12 according as the index value of the article exceeds 1.50 whereby a substantially achromatic surface reflection reducing coating on said surface of the article results.

9. The method of forming a substantially achromatic surface reflection reducing coating on the normally light reflecting surface of a transparent article having an index of refraction between approximately 1.50 and approximately 1.52, said method comprising the steps of depositing a substantially smooth transparent layer of silica having an index of refraction of about 1.45 on said surface of the article to a uniform optical thickness of substantially one-fifth wave length of the incident light, applying onto the exposed surface of said first layer a substantially uniform thin layer of a volatile liquid containing substantially uniformly dispersed therein a plurality of discrete, sub-microscopic, microgranular approximately isometric transparent particles of solid substantially anhydrous inorganic material having an index of refraction greater than unity, said particles being of a diameter less than 625 angstroms and substantially insoluble in the liquid, and the liquid being substantially inert in its effect on the particles and on said first layer, and allowing said liquid to evaporate to deposit the particles on the surface of said first layer, while retaining the particles substantially unchanged in their physical character throughout the process, the thickness of the liquid layer applied being controlled according to the concentration of the particles in said layer to produce a resultant dry layer of said particles piled in a plurality of mound-like projections to approximately a quarter wave-length in thickness, whereby a substantially achromatic surface reflection reducing coating on said surface of the article results.

10. The method of forming a substantially achromatic surface reflection reducing coating on the normally light reflecting surface of a transparent article having an index of refraction greater than 1.50 and up to approximately 1.70, said method comprising the steps of depositing a substantially smooth transparent layer of a uniform mixture of titanium dioxide and silica in controlled proportions on said surface of the article to a uniform optical thickness of substantially one-fifth wave length of the incident light, applying onto the exposed surface of said first layer a substantially uniform thin layer of a volatile liquid containing substantially uniformly dispersed therein a plurality of discrete, sub-microscopic, microgranular approximately isometric transparent particles of solid substantially anhydrous inorganic material having an index of refraction greater than unity, said particles being of a diameter less than 625 angstroms and substantially insoluble in the liquid, and the liquid being substantially inert in its effect on the particles and on said first layer, and allowing said liquid to evaporate to deposit the particles on the surface of said first layer, while retaining the particles substantially unchanged in their physical character throughout the process, the thickness of the liquid layer applied being controlled according to the concentration of the particles in said layer to produce a resultant dry layer of said particles piled in a plurality of mound-like projections to approximately a quarter wave-length in thickness, the proportions of titanium dioxide to silica in said first layer being so controlled that said first layer will have an index of refraction less than that of the article by a value greater than .05 and increasing up to .12 according as the index value of the article exceeds 1.50 whereby a substantially achromatic surface reflection reducing coating on said surface of the article results.

HAROLD R. MOULTON.

REFERENCES CITED

The following references are of record in the file of this patent:

UNITED STATES PATENTS

| Number | Name | Date |
|---|---|---|
| 2,281,474 | Cartwright | Apr. 28, 1942 |
| 2,331,716 | Nadeau et al. | Oct. 12, 1943 |
| 2,366,516 | Geffcken | Jan. 2, 1945 |
| 2,366,687 | Osterberg | Jan. 2, 1945 |
| 2,376,428 | Hansell | May 22, 1945 |
| 2,420,168 | Dimmick | May 6, 1947 |
| 2,432,484 | Moulton | Dec. 9, 1947 |

FOREIGN PATENTS

| Number | Country | Date |
|---|---|---|
| 537,591 | Great Britain | June 27, 1941 |

OTHER REFERENCES

Strong: Article in Journal of the Optical Society, volume 26, January 1936, pages 73, 74.